Dec. 16, 1924.  
W. G. KOUPAL  
APPARATUS FOR MAKING SHEET GLASS  
Filed Dec. 5, 1923    3 Sheets-Sheet 2

1,519,314

INVENTOR  
Walter G. Koupal  
by  
James C. Bradley  
atty

Dec. 16, 1924.
W. G. KOUPAL
APPARATUS FOR MAKING SHEET GLASS
Filed Dec. 5, 1923   3 Sheets-Sheet 3
1,519,314
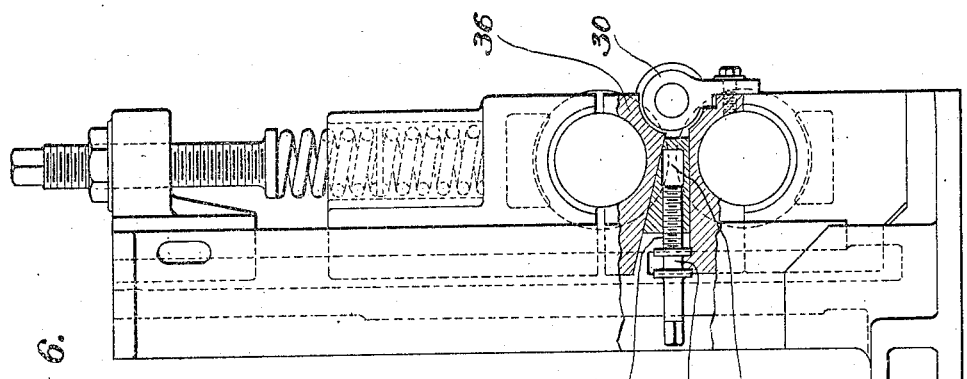
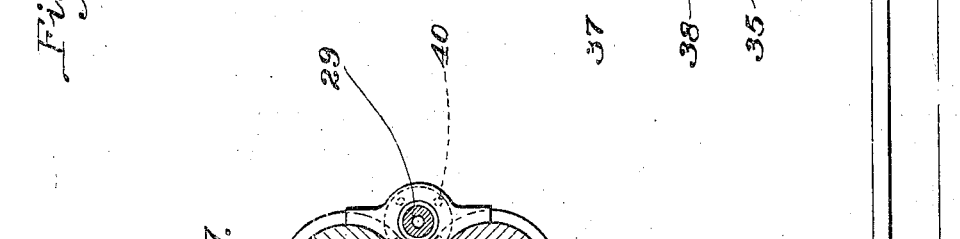
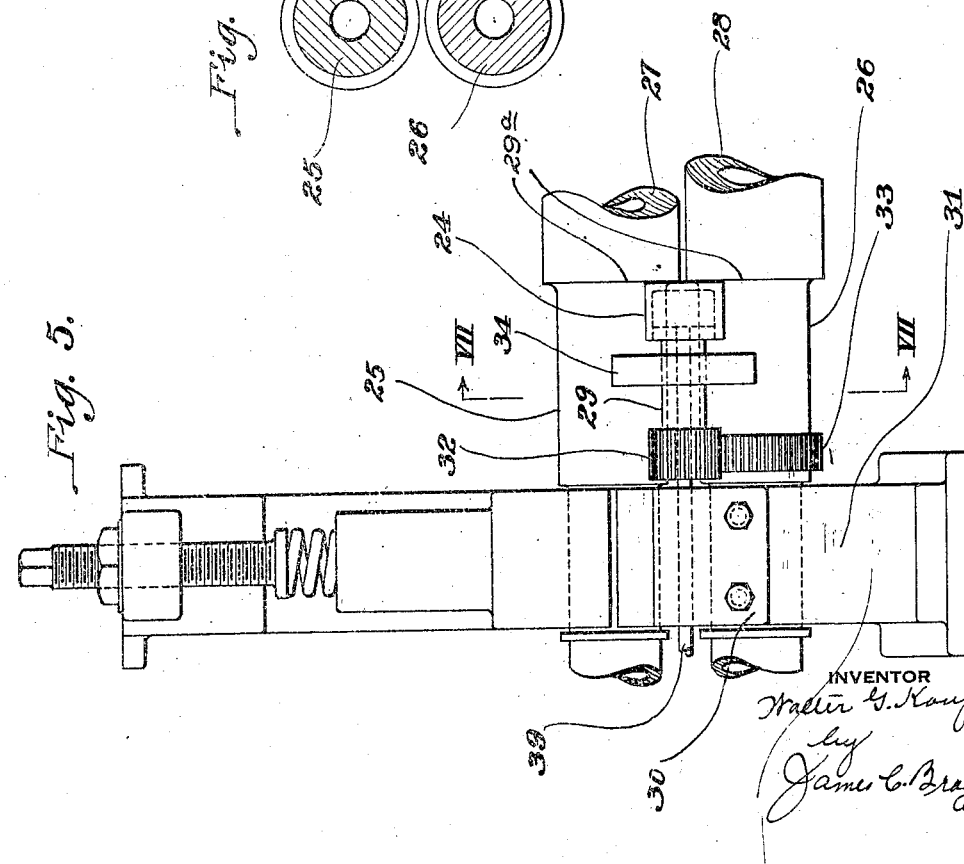
INVENTOR
Walter G. Koupal
by
James C. Bradley
Atty Patented Dec. 16, 1924.

1,519,314

UNITED STATES PATENT OFFICE.

WALTER G. KOUPAL, OF TARENTUM, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed December 5, 1923. Serial No. 678,599.

*To all whom it may concern:*

Be it known that I, WALTER G. KOUPAL, a citizen of the United States, and a resident of Tarentum, in the county of Allegheny and State of Pennsylvania, have made a new and useful invention in Improvements in Apparatus for Making Sheet Glass, of which the following is a specification.

Figure 1:
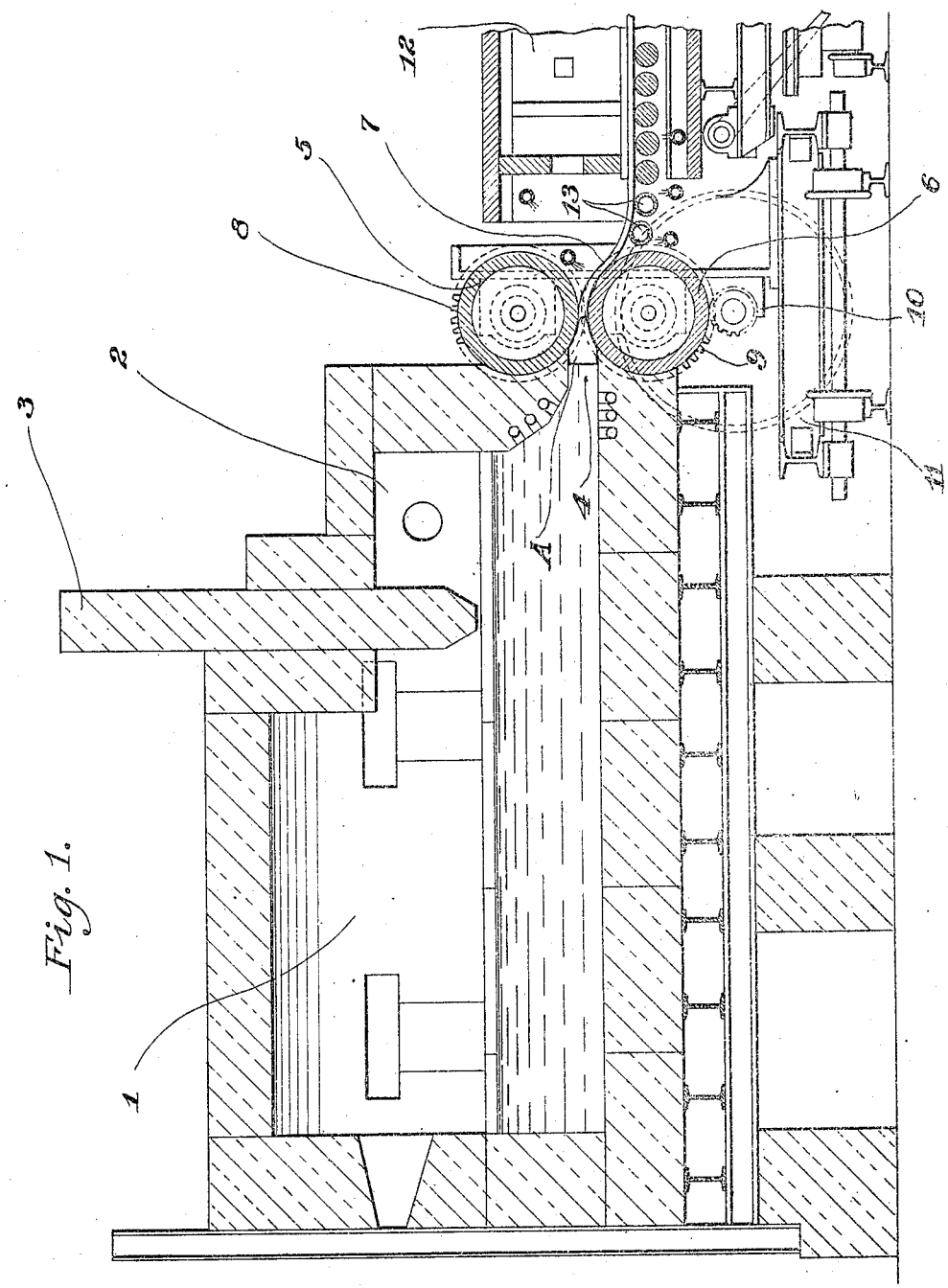
Figure 2:
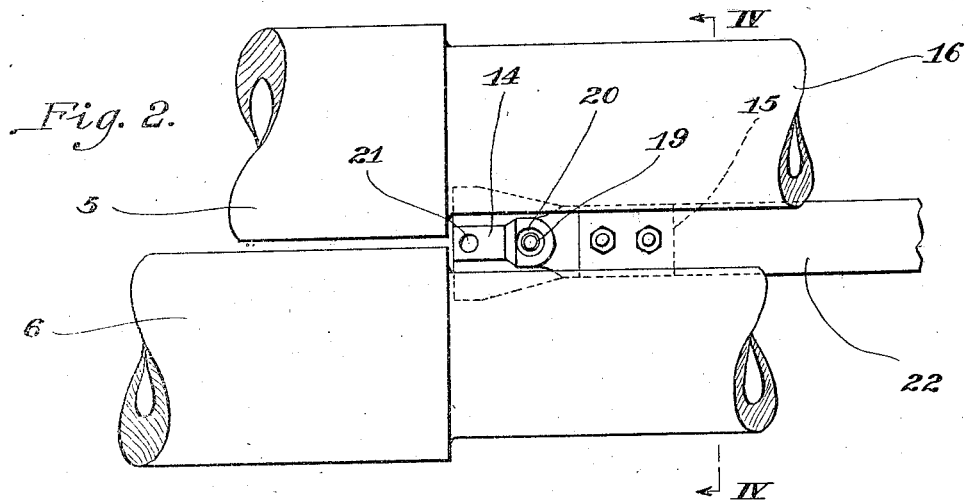
Figure 3:
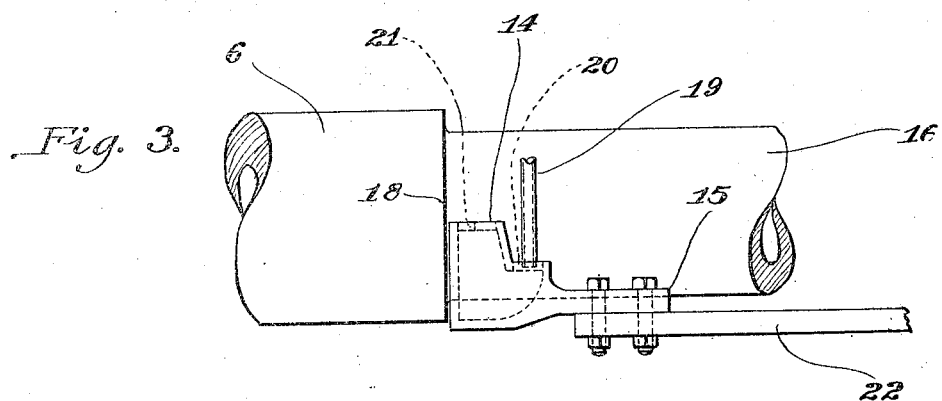
Figure 4:
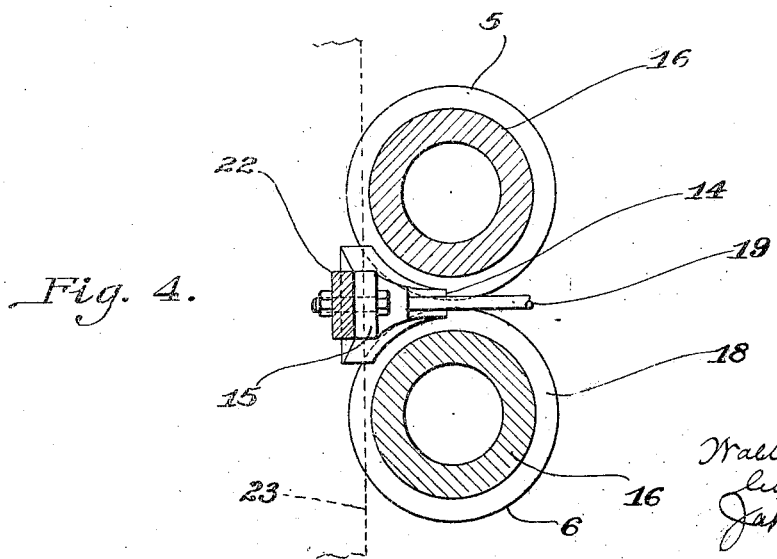

The invention relates to apparatus for making sheet glass of the type set forth in the pending application of Frederick Gelstharp, Serial No. 656,441, in which a pair of rolls are employed for rolling the glass into a sheet, and in which the pass between the rolls constitutes the outlet from the glass melting tank. More particularly, the invention relates to the means for closing the spaces between the rolls at the ends thereof, and has for its principal objects the provision of an improved structure for accomplishing this result, which is more accessible for observation and more readily replaceable than the devices heretofore employed, and which can be more readily maintained at a desired and uniform temperature from its tip to its base than the devices heretofore used in which the closure members fitted back between the body portions of the rolls. One embodiment of the invention is illustrated in the accompanying drawings wherein:

Figure 1 is a vertical section through a complete apparatus, including my invention. Fig. 2 is a front elevation at the end of a pair of rolls showing the application of the closure device constituting the invention thereto. Fig. 3 is a plan view with the top roll removed. Fig. 4 is a section on the line IV—IV of Fig. 2. Fig. 5 is a front elevation showing a modification. Fig. 6 is a side elevation, partially in section of the Fig. 5 construction. And Fig. 7 is a section on the line VII—VII of Fig. 5.

Referring to the general arrangement as shown in Fig. 1, which is somewhat diagrammatic, 1 is a melting tank having a forehearth 2 and a shear cake or gate 3 for cutting off the supply of glass to the forehearth. At the front of the forehearth is an outlet slot 4, and opposite this slot are a pair of water cooled rollers 5 and 6 between which the glass sheet 7 is continuously formed. These rolls are provided with gears 8 and 9 meshing with each other, the gear 9 being driven from a pinion 10 connected with a motor (not shown). The rolls and driving mechanism therefor, including the motor, are mounted on a truck 11 so that the mechanism may be moved away from the front of the tank. Forward of the rolls is the leer 12 of the roller type to which the glass sheet 7 is conducted over the water cooled rolls 13. This apparatus is fully shown and described in said Gelstharp application, the present invention relating particularly to the closure members A at the ends of the rolls for preventing the molten glass from flowing out laterally at these points. The construction of these closure members which are referred to in the art as "guns" is shown in Figs. 2, 3 and 4. The device preferably comprises a casting and includes a hollow head 14 and a flange 15, the material used being preferably a heat resisting composition such as calite or nichrome. The head 14 is roughly triangular in shape as indicated in Fig. 4 with its inner face flat, and this device fits in between the reduced portions 16 of the rolls with the flat inner face in close proximity to the shoulder 18 formed at the juncture of the body portion of the roll and its reduced portion. In this manner the head 14 serves to close the triangular space at the ends of the rolls and thus prevent an escape of fluid gas at this point.

In order to secure a smooth edge upon the sheet of glass which is being formed, and to secure an adherence of such glass to the head 14, this member is preferably heated by means of a combustion of gas inside the head, such gas being supplied through the pipe 19 leading into the perforation 20 so that a supply of air sufficient to promote complete combustion is drawn in by the flow of the gas. The perforation 21 is provided to permit of the escape of the gases of combustion. As indicated in Figs. 3 and 4, the head 14 is spaced away from the shoulder 18 and from the surfaces of the reduced portions 16 of the roll, the space between the shoulder and the head, however, being relatively narrow so that no escape of glass occurs. The flange 15 is bolted to the supporting bar 22 which is in turn carried out to the framework of the apparatus (not shown) and secured thereto by bolts. The line of the front wall of the furnace is indicated by the dotted line 23 in Fig. 4.

The device as illustrated and described involves an advantage over closure devices such as those shown in the application referred to in which the members extend in between the body portions of the rolls as it is easier to maintain an outside closure member, such as the one here illustrated and described, at a uniform temperature throughout its length. The device is also more accessible than a device which is placed between the body portions of the rolls and is more readily removed and replaced. Furthermore, no adjustment is required of the devices when the rolls are adjusted close together to roll thin glass such as is the case with the inside closure devices.

Figs. 5, 6 and 7 illustrate a modification in which a hollow closure member 24, circular in cross section, and mounted for rotation, is employed instead of the closure member of Figs. 1 to 4. This member 24 fits in between the reduced portions 25 and 26 of the rolls 27 and 28, and its end surface abuts the shoulders 29ª so that in principle the construction is the same as that of the construction first described. The member 24 is mounted upon a hollow shaft 29 carried by the bearing 30 which is in turn bolted to the housing 31 in which the roll 28 is journaled. The shaft 29 also carries a pinion 32 which is driven from the pinion 33 carried by the reduced portion 26 of the roll 28. In order to steady and position the shaft carrying the member 24, the steady yoke 34 is mounted on such shaft and engages the reduced portions 25 and 26 of the rolls. The upper roll 27 is adjusted vertically by means of the wedges 35 at each end which wedges engage the housing 36 in which the upper roll is journaled. This wedge is moved back and forth by means of the screw 37 swiveled to the lower housing as indicated at 38. Gas is supplied to the member 24 from the inlet pipe 39 leading through the center of the shaft 29. Provision is made for the escape of the products of combustion from the member 24 by means of the perforations 40 in the end walls of the member. The member, by reason of its rotation, is maintained at a uniform temperature and the rotation of its inner face over the edge of the sheet which is being formed tends to smooth such edge.

What I claim is:

1. In combination with a tank adapted to carry a bath of molten glass, and having an outlet through one of its walls, and a pair of driven rolls having reduced end portions with shoulders at the juncture of said reduced portions and the body portions of the rolls, of closure members at each end of the rolls abutting said shoulder and closing the triangular spaces at the ends of the body portions on the inlet side of the rolls.

2. In combination with a tank adapted to carry a bath of molten glass, and having an outlet through one of its walls, and a pair of driven rolls having reduced end portions with shoulders at the juncture of said reduced portions and the body portions of the rolls, of closure members at each end of the rolls abutting said shoulders and closing the triangular spaces at the ends of the body portions on the inlet side of the rolls, and means for heating said closure members.

3. In combination with a tank adapted to carry a bath of molten glass, and having an outlet through one of its walls, and a pair of driven rolls having reduced end portions with shoulders at the juncture of said reduced portions and the body portions of the rolls, metal closure members at each end of the rolls fitting between said reduced portions and abutting said shoulders and closing the triangular spaces at the ends of the body portions on the inlet side of the rolls, and means for heating said members.

4. In combination with a tank adapted to carry a bath of molten glass, and having an outlet through one of its walls, and a pair of driven rolls having reduced end portions with shoulders at the juncture of said reduced portions and the body portions of the rolls, hollow metal closure members at each end of the rolls fitting between said reduced portions and abutting said shoulders and closing the triangular spaces at the ends of the body portions on the inlet sides of the rolls, and means for supplying a mixture of gas and air to the interior of said closure members.

In testimony whereof, I have hereunto subscribed my name this 1st day of November, 1923.

WALTER G. KOUPAL.